United States Patent [19]
Mori et al.

[11] Patent Number: 5,727,050
[45] Date of Patent: Mar. 10, 1998

[54] COMMUNICATION DEVICE HAVING A FACSIMILE MODULE FOR CARRYING OUT CONFIDENTIAL COMMUNICATION

[75] Inventors: Hideki Mori, Kyoto; Makoto Yamamoto, Yasu-gun, both of Japan

[73] Assignee: Murata Kikai Kabushiki Kaisha, Kyoto, Japan

[21] Appl. No.: 627,273

[22] Filed: Apr. 4, 1996

[30] Foreign Application Priority Data

Apr. 12, 1995 [JP] Japan ................... 7-087132

[51] Int. Cl.⁶ ........................... H04M 11/00
[52] U.S. Cl. .................. 379/100.09; 358/434
[58] Field of Search ................ 379/100, 96–99, 379/93, 94, 67, 88, 89, 100.01, 100.08, 100.09, 100.1, 93.17, 93.22, 93.37; 358/400, 402, 403, 407, 434–442, 468

[56] References Cited

U.S. PATENT DOCUMENTS

| | | | |
|---|---|---|---|
| 5,008,926 | 4/1991 | Misholi | 379/100 |
| 5,130,818 | 7/1992 | Tadokoro | 358/402 |
| 5,530,740 | 6/1996 | Iribarren et al. | 379/89 |
| 5,557,659 | 9/1996 | Hyde-Thomson | 379/88 |

*Primary Examiner*—Wing F. Chan
*Attorney, Agent, or Firm*—Armstrong, Westerman, Hattori, McLeland & Naughton

[57] ABSTRACT

A communication device having a facsimile module that can carry out confidential communication regardless of the type of communication device of a caller. A called station number (telephone or facsimile number) detector to which a telephone set on a called side is connected is an integrated unit of the facsimile module. A CPU common to the called station number detector and the facsimile module is provided in the facsimile module. The CPU is connected to ROM, RAM, image memory and the like and determines from the called station number and password entered by the caller whether use of a mail box in the image memory should be permitted or not. If the use of the mail box is permitted, the CPU allows communication between the caller terminal and the mail box. Otherwise, normal facsimile communication is carried out.

2 Claims, 5 Drawing Sheets

| CALLED STATION NUMBER | COMMUNICATION FUNCTION | MAILBOX NUMBER | PASSWORD |
|---|---|---|---|
| 0001 | CONVERSATION | | |
| 0002 | NORMAL FACSIMILE COMMUNICATION FUNCTIONS | | |
| 0003 | COMMUNICATION USING FIRST MAILBOX | #1 | 1111 |
| 0004 | COMMUNICATION USING SECOND MAILBOX | #2 | 2222 |

| CALLED STATION NUMBER | COMMUNICATION FUNCTION | MAILBOX NUMBER | PASSWORD |
|---|---|---|---|
| 0001 | CONVERSATION | | |
| 0002 | NORMAL FACSIMILE COMMUNICATION FUNCTIONS | | |
| 0003 | COMMUNICATION USING FIRST MAILBOX | #1 | 1111 |
| 0004 | COMMUNICATION USING SECOND MAILBOX | #2 | 2222 |

FIG. 4

COMMUNICATION DEVICE HAVING A FACSIMILE MODULE FOR CARRYING OUT CONFIDENTIAL COMMUNICATION

BACKGROUND OF THE INVENTION

1. Technical Field

This invention relates to a communication device such as a facsimile device provided with a called station number information detection function.

2. Background Art

Facsimile devices provided with a confidential communication function are known in the art. In this kind of facsimile device, a plurality of boxes with assigned numbers is arranged in an image memory of the facsimile device as an area for storing the confidentially received image data. When confidential image data is sent from a calling station (i.e., calling facsimile device), that confidential image data is stored in a confidential box of the image memory to which a certain number is attached. Image data stored in the box having a specified number is printed out upon specification of the box number and inputting of a password by a user. NSF and NSC signals designed as non-standard signals for a facsimile control procedure are generally used for control of such confidential communications. By exchanging the NSF and NSC signals between a calling station and a called station, it is determined whether the transmitted image data is for confidential communication or not. The box number and the password are also recognised during the above signal exchange. The confidential communication is initiated after the above determination and recognition.

As mentioned earlier, the signals used for controlling the confidential communication are non-standard signals, and these signals' way of indicating the data related to the confidential communication differs for each manufacturer. As a consequence, even when a confidential function is provided on a called facsimile device, confidential communication cannot be carried out if the two facsimile devices (i.e., calling and called facsimile devices) that intend to communicate with each other are from different manufacturers.

SUMMARY OF THE INVENTION

It is an object of the present invention to propose a communication device that is capable of receiving/transmitting confidential communication data from/to a caller irrespective of the type of communication device of the caller.

Another object of the present invention is to provide a communication device which enables confidential communication using a password.

Still another object of the present invention is to provide a communication device which can notify a caller of a fact that a password designated by the caller is invalid.

According to one aspect of the present invention, there is provided a communication device of a type having a called station number information detection function, including a plurality of communication data memory parts arranged corresponding to a plurality of called station number information, a selection means for selecting one of the memory parts based on detection of the called station number information acquired from an exchange upon a call from a caller, and a control means for performing at least one of either a first operation that transmits data from the selected memory part or a second operation that stores incoming data into the selected memory part. When a signal which carries called station number information is sent to the communication device of the present invention (i.e., a called facsimile device) from the exchange upon a call from a communication terminal of the caller (i.e., a calling facsimile device), a particular memory part corresponding to the called station number is selected by the selection means. Then, the image data inside the selected memory part is transmitted to the caller or the received data is stored into the selected memory part under control of the control means. In this way, by utilizing the called station number detection function, confidential communication can be realised without using non-standard procedure signals. In other words, the confidential communication is conducted using the facsimile number dialed by an operator of the calling facsimile device.

A password may be assigned to at least one of the memory parts and the control means may permit communication which uses the selected memory part based on detection of a password from the caller. Communication using the selected memory part is only permitted if the password transmitted from the caller coincides with the password assigned to the selected memory part. Due to this, only a specified person who knows the correct password can store image data in the particular memory part and/or draw the image data from the memory part, and therefore secrecy of the communication data is maintained with more reliability.

The communication device of the invention may further include a notification means for notifying the caller of a fact that the password from the caller is not the same as the password assigned to the selected memory part. This notification may be given to the caller during data reception. When the password indicated by the caller and the password assigned to the selected memory part are different, a mistaken password etc can be confirmed on the caller's side. Therefore, the caller is promptly able to cope with the fact that what he or she intends to do does not occur. The user may check the password and re-input the password or send data in a non confidential manner.

These and other objects and advantages of the present invention will become more apparent from the following detailed description and the appended claims as taken in conjunction with the accompanying drawings.

BRIEF DESCRIPTION OF THE ACCOMPANYING DRAWINGS

FIG. 4 is a diagram showing one example of a table of transmission functions.

DETAILED DESCRIPTION OF THE PREFERRED EMBODIMENTS

Below, one embodiment realised according to the present invention will be described based on the accompanying diagrams.

Figure 1:
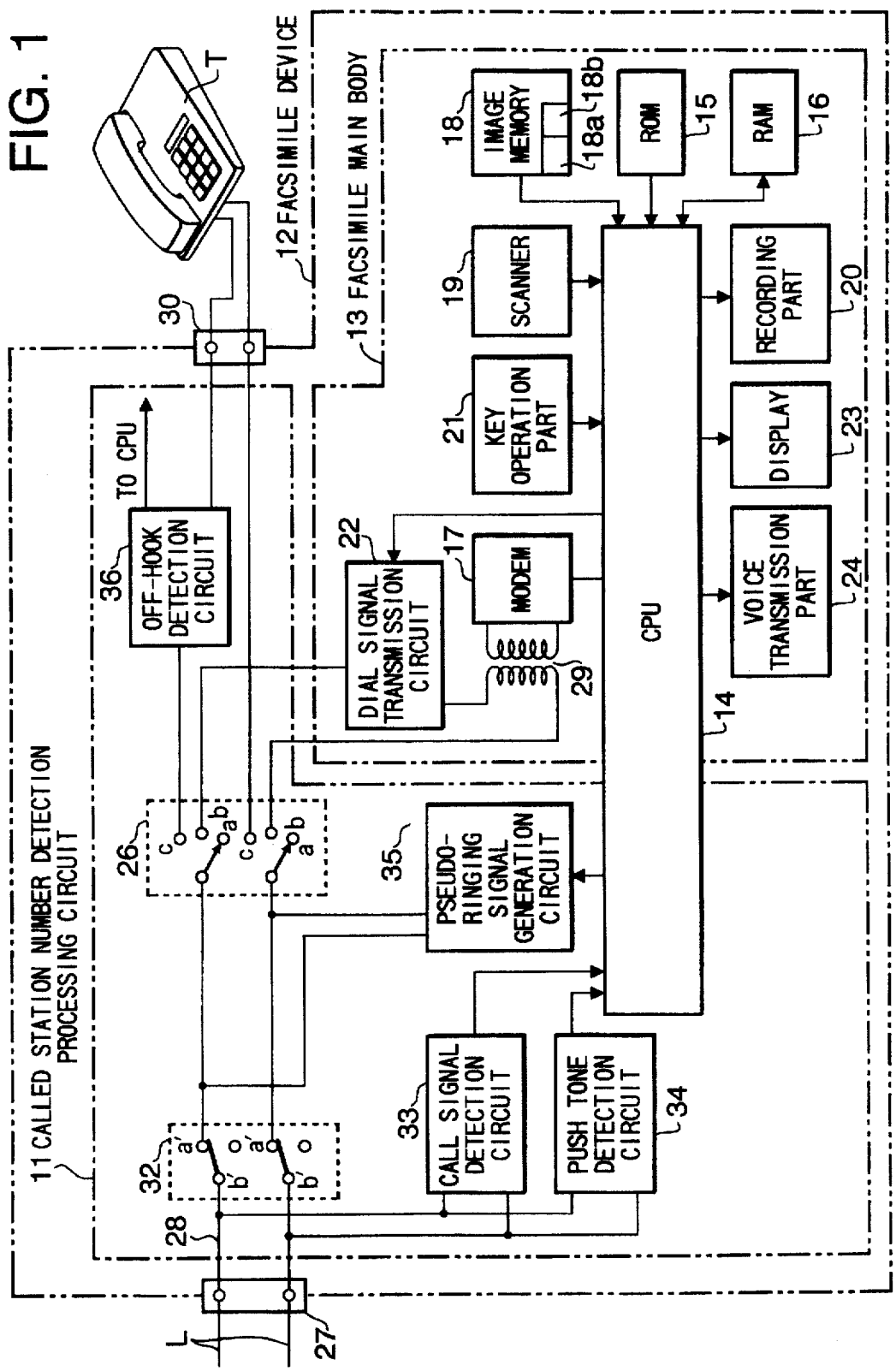
FIG. 1 is a block diagram of a facsimile machine showing one embodiment of the present invention.

On the present embodiment as shown in FIG. 1, a called station number (i.e., telephone number or facsimile number dialed by a caller) detecting and processing circuit 11 used for carrying out called station number detection and processing operations is incorporated as one unit inside a facsimile device 12 and a telephone set T is connected to this called station number detection and processing circuit 11.

A facsimile module 13 for carrying out actual facsimile operations is also arranged inside the facsimile device 12. A CPU (central processing unit) 14 common with said called station number detection circuit 11 is provided in the facsimile main body 13. A ROM (read only memory) 15 which memorizes a plurality of programs for controlling the operations of the facsimile main body 13 and the operation of the called station number detection circuit 11, a RAM (random access memory) 16 that temporarily memorizes various information, and an image memory 18 that memorizes the communication image data are connected to the CPU 14. In the present embodiment, the selection and control means are formed by the CPU 14, ROM 15 and RAM 16. A plurality of mail boxes 18a/18b/ ... are defined in the image memory 18 as areas for storing the image data. A number (for example #1 /#2/ . . . ) is assigned to each of the memory boxes.

A setting table with the communication functions and the passwords for using those communication functions are pre-memorized corresponding to the plurality of called station number information in said RAM 16 as shown in FIG. 4 for example. It should be noted that in the present embodiment, the conversation function by the telephone set T, the normal facsimile communication function by the facsimile main body 13, the function that uses the mail box 18a in the facsimile communication and the function that utilizes the mail box 18b in the facsimile communication are assigned corresponding to differing called station number information. In the example of this FIG. 4, one of the four functions will be selected depending upon last four figures of a called station number (i.e., "0001" to "0004"). Specifically, the conversation function is assigned to called station number information having "0001" at its last four figures and the normal facsimile function is assigned to called station number information having "0002". Passwords are not set for these two functions. The function that uses the first mailbox 18a is assigned to the called station number information having "0003" and a four figure number, for example "1111", is set as a password for this function. Likewise, the function that uses the second mailbox 18b is assigned to the called station number information having "0004" and a four figure number, for example "2222", is set as a password for this function.

Referring back to FIG. 1, a modem 17, scanner 19, recording part 20, key operation part 21, dial signal transmission circuit 22, display 23 and voice transmission part 24 are connected to the CPU 14 in the facsimile module 13. The modem 17 carries out modulation and demodulation of the transmission and reception data. The scanner 19 reads the image on a document. The recording part 20 carries out recording (i.e., printing) on a recording paper based on the received image data and the like. The key operation part 21 is for inputting the telephone or facsimile number of a third party, beginning the facsimile operation and the like. Also, this key operation part 21 possesses a function for inputting and changing data in the table 4 shown in FIG. 4: the 4-digit numbers (called station numbers), the communication functions, the mail box numbers and the passwords. The dial signal transmission circuit 22 generates a dial signal corresponding to a telephone number input by a user manipulating the key operation part 21. The display 23 is for displaying operation procedures, communication information and the like. The voice transmission part 24, as a notification means, is for transmitting a predetermined voice message to the caller communication terminal when the passwords do not agree or no data is received.

Next, said called station number detection circuit 11 will be described. A change over relay switch 26 selectively connects one of the contacts a–c to a wiring 28 connected to a connection terminal 27 of a telephone line L under control of the CPU 14. The contact a is an off-contact which is selected at an initial state time when the called station number detection circuit 11 is in the signal reception stand by state. The telephone line L is not connected to any elements. On the other hand, the contact b connects the telephone line L to the modem 17 of the facsimile main part 13 via a transformer 29 and the contact c connects the telephone line L to the telephone set T via a connection terminal 30.

A relay 32 is arranged to carry out temporary disconnection of the telephone line L. When the relay 32 is switched to the contact a' by the control of the CPU 14, the telephone line L is connected to said change over switch 26. Conversely, when the relay 32 is switched to the contact b', the telephone line L is disconnected.

It should be stated that in the initial state where the called station number detection circuit 11 is in the signal reception stand by state, both the change over switch 26 and the relay 32 are positioned on the contacts a and a' respectively. A call signal detection circuit 33 is connected to the wiring 28 to detect a 20 Hz ringing signal transmitted from the telephone exchange (not shown) via the telephone line L and to output the result of that detection to the CPU 14. Similarly, a push tone detection circuit 34 is connected to the wiring 28 to detect a predetermined push tone (DTMF signal) transmitted from the telephone exchange and to output the result of the detection to the CPU 14.

A pseudo ringing signal generation circuit 35 is connected to CPU 14 to transmit a pseudo ringing signal to the telephone set T via the wiring 28 and change over relay switch 26 thereby calling the user by ringing the telephone set T. An off-hook detection circuit 36 is connected to the telephone set T. It detects an off-hook state (when the handset is lifted) of the telephone set T and outputs the result of that detection to the CPU 14.

Figure 2:
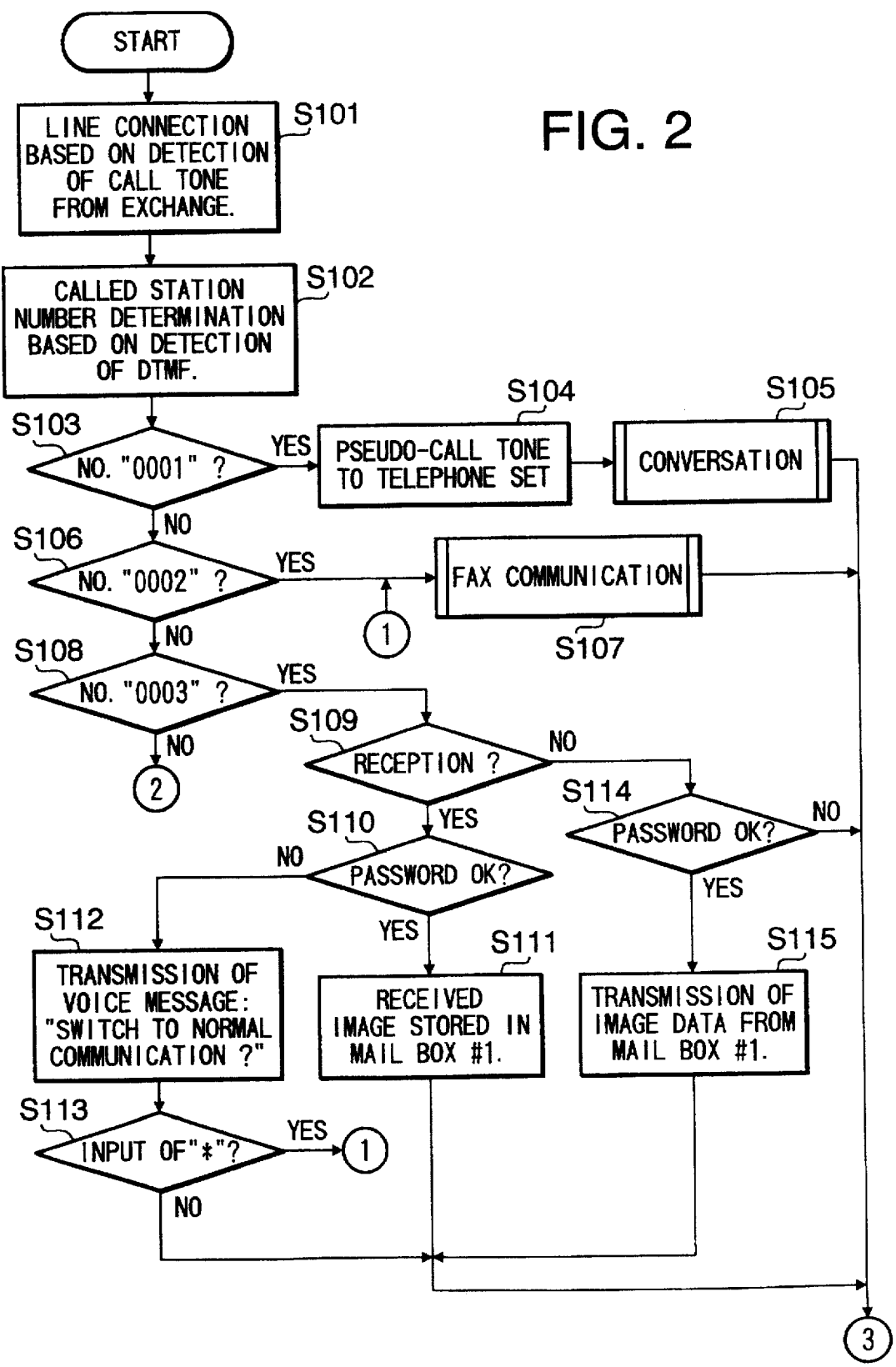
FIG. 2 is a flow chart showing operations of the confidential function of the facsimile machine shown in FIG. 1.
Figure 3:
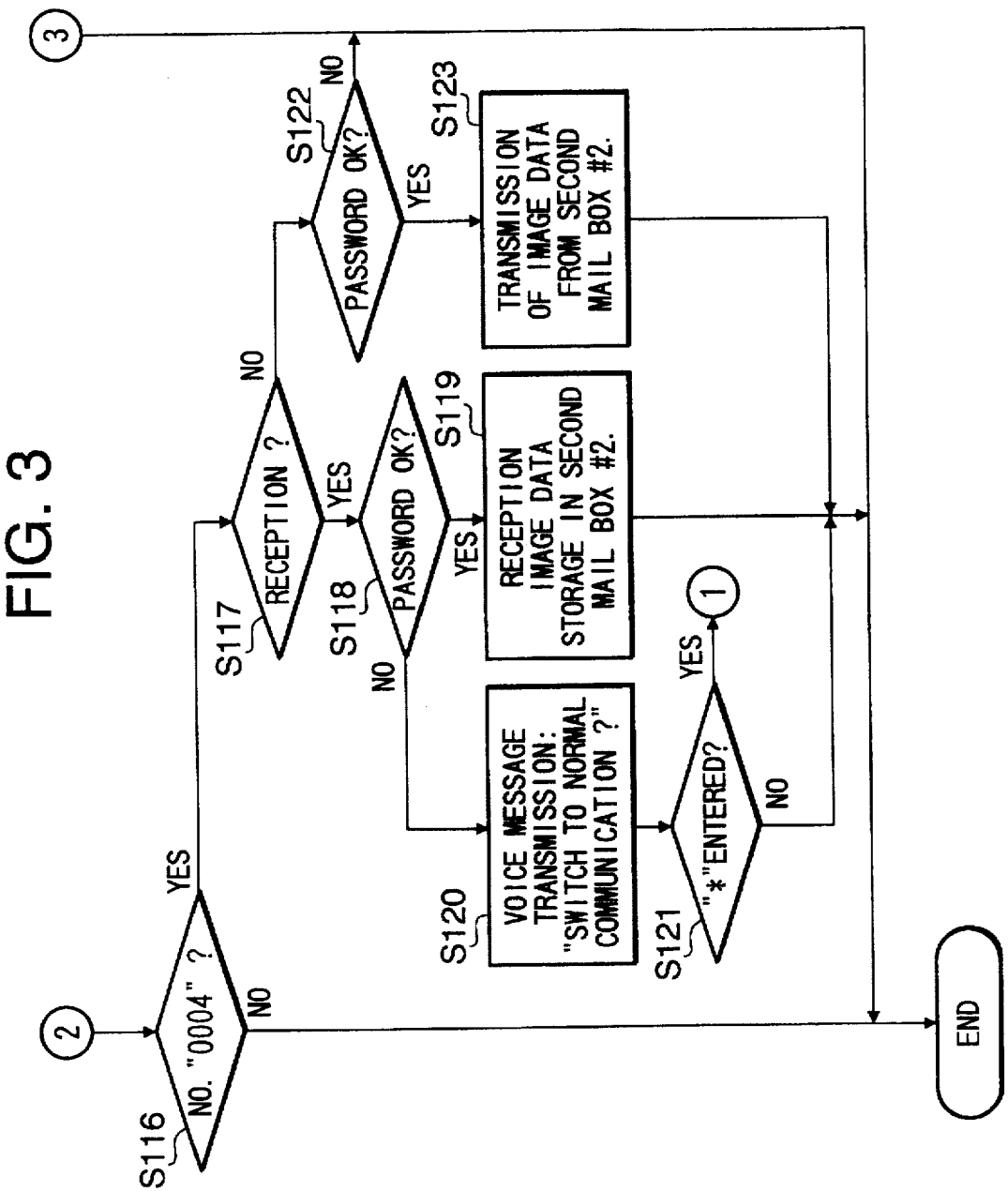
FIG. 3 is a continuance of the flow chart of FIG. 2.

An operation for called number detection as shown in the flow charts of FIGS. 2 and 3 is carried out under the control of the CPU 14 in the called number detection circuit 11. Firstly, when a call is made from an external calling device (not shown) to the facsimile device 12 of the present embodiment, a 20 Hz ringing signal enters from the telephone exchange (not shown) and this ringing signal is detected by the ringing signal detection circuit 33. Then the change over relay switch 26 switches from the contact a to the contact b, the telephone line L is connected with the communication device of the present invention and a pre-signal reception state is established (step S101).

Next, a telephone or facsimile number is transmitted from the telephone exchange in the form of push tone signal. When this push tone signal is detected by the push tone detection circuit 34, the telephone or facsimile number is recognised from said push tone signal by deciphering/decoding operation of the CPU 14 (step S102).

Next, determination of whether said telephone or facsimile number information (i.e., called station number information) has "0001" at its last four digits or not is carried out (step S103). When the called number information has "0001", the switch over relay switch 26 is switched to the contact c to carry out the conversation function in accordance with the setting table shown in FIG. 4, and the relay 32 is switched to the contact b' to disconnect the telephone line L once. Then, a pseudo ringing signal is output from the pseudo ringing signal generation circuit 35 to the telephone set T so that the telephone set T is rung (step S104). Following that, when the off-hook of the telephone set T is detected by the off-hook detection circuit 36, the relay 32 is switched over to the contact a'. As a consequence, the telephone set T and telephone line L are connected with each other and a conversation state is entered (step S105). When conversation is complete, the telephone line L is disconnected from the telephone set T and the processing finishes.

Alternatively, when the recognised push tone signal is "0002" (YES at step S106), the switch over relay switch 26 is switched to the contact b for normal facsimile communication in accordance with the setting table of FIG. 4, and the relay 32 is switched to the contact b' for disconnection of the telephone line L. Then, after a predetermined time period, the relay 32 is automatically switched to the contact a'. As a consequence, the facsimile module 13 and the telephone line L are connected with each other, the image data from the caller is received by the facsimile module 13 and printing out is executed on the recording paper at the recording part 20 (step S107). When the printing is complete, the telephone line L is disconnected from the facsimile module and the processing finishes.

If the aforementioned push tone signal is "0003" (YES at step S108), the switch over relay switch 26 and the relay 32 are switched to the contacts b and b' respectively, and the telephone line L is disconnected once. Then, after a predetermined time period, the relay 32 is automatically switched to the contact a' and the facsimile module 13 and the telephone line L are connected with each other. In continuance, the CPU 14 makes determination of whether the subsequent facsimile operations are reception operations of the image data from the calling device based on the facsimile protocol signals transmitted between the calling and called devices (step S109). When it is determined to be an image data reception, determination of whether the password input by the caller is the same as the password "1111" assigned to the four-digit number "0003" of the called station number information stored in the setting table prepared in the RAM 16 is carried out (step S110). When the passwords are the same, the received image data is stored in the first mail box 18a defined in the image memory 18 (step S111). When the data storage is complete, the lines are disconnected and processing finishes.

Conversely, when the passwords are not the same (NO at step S110), a voice message that asks whether normal facsimile communication is sufficient, for example "The password is incorrect. If normal communication is sufficient, please press the asterisk (*) key." is transmitted to the caller from the voice transmission part 24 via the modem 17 (step S112). It should be noted that this case where the passwords do not agree also includes the case where no password is entered by the caller. In response to this voice message, when a push tone signal corresponding to the input of the "*" key is received from the caller (step S113), the program proceeds to step S107 to perform the normal facsimile communication (i.e., non confidential data reception) thereby printing the received image data on the recording paper by the recording part 20. On the other hand, if a push tone signal corresponding to the input of a key other than an "*" is transmitted from the caller or if no push tone signal is transmitted within a predetermined time period, the processing is finished as impossible processing.

At step S109, when the communication is not judged to be a reception operation but a transmission operation to the caller from the called party who is using a so-called polling function, firstly determination of whether the password input by the caller is the same as the password "1111" assigned to the first or #1 memory part 18a is carried out in the CPU 14 (step S114). When the passwords are the same, the image data stored in the first mail box 18a is transmitted to the caller via the modem 17 (step S115). When the data transmission is complete, the lines are disconnected and the processing finishes. Conversely, when the passwords do not agree or there is no password input, the image data inside the first mail box 18a is not transmitted and the processing finishes.

Next, when said push tone signal is "0004" (step S116), processing operations similar to the foregoing case of "0003" are carried out. In short, when the input password agrees with the password "2222" assigned to the called station number information "0004", communication of the image data is executed using the second or #2 mail box 18b. Also, when they do not agree, the procedures move to normal facsimile operations or the processing finishes without communication taking place (steps S117–S123).

Figure 5:
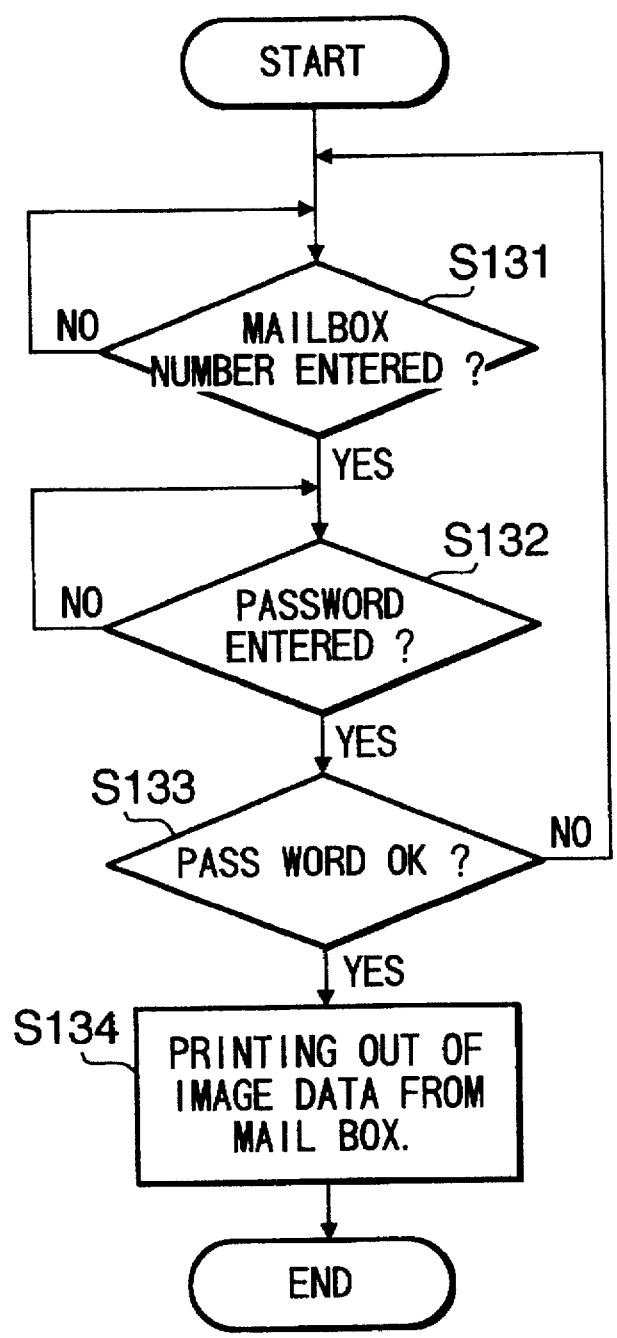
FIG. 5 is a flow chart showing the operations of the memorising function of the facsimile machine shown in FIG. 1.

After the aforementioned communication, the image data stored in the mail boxes 18a/18b is recorded by processing operations as shown in the flow chart of FIG. 5. Firstly, when the mail box number "#1" or "#2" and then a four figure number being a password corresponding to a particular mail box number are entered from the key operation part 21 of the facsimile module 13, the CPU 14 makes determination of whether the input password is the correct password or whether the input password is the one really assigned to the specified mail box in accordance with the table of FIG. 4 (steps S131–S133). When the passwords coincide with each other, the image data inside the specified mail box 18a/18b is read from the image memory 18, printed out at the recording part 20 (step S134) and the processing finishes. Conversely, when the password is determined to not agree at step S133, the procedures move to step S131, mail box number input is returned to, and the correct mail box number and password are waited for.

According to the present embodiment constructed as described above, when a particular station number (i.e., telephone or facsimile number) is called from a communication device of a caller, following a ringing signal from the exchange, a certain signal corresponding to the aforementioned called station number is input to the called communication device. Then, the called station number is obtained from the above certain signal by the decoding/deciphering process of the CPU 14, and the corresponding mail box 18a/18b in the image memory 18 is selected. After that, the image data from the caller can be stored in the designated mail box 18a/18b or in reverse, the image data inside the mail box 18a/18b can be transmitted to the caller. Because of this, confidential communication can be realised by using the called station number information, not using non-standard facsimile control procedure signals. As a consequence, even if the transmitting and receiving devices carrying out communication are from different manufacturers, confidential communication of image data can be carried out between these two devices.

Also, the present embodiment has a construction in which a password is assigned to each of the mail boxes 18a and 18b and indication of password is necessary to carry out communication using the mail box 18a/18b. Upon presentation of the password, it is determined whether the password input from the caller and the password set in the setting table in the RAM 16 of the called communication device are the same or not, and only when they agree can the mail box 18a/18b is allowed to be used. Accordingly, only a specific person who knows the password is able to use the mail box 18a/18b and the confidentiality of the communication data inside the mail boxes 18a and 18b is reliably maintained.

Furthermore, when image data is received and the password from the caller is not the same as the password of the designated mail box 18a/18b or no password is entered, a voice message informing that the passwords are not the same or no password has been entered is transmitted to the caller communication device from the voice transmission part 24 via the modem 17. Consequently, an operator of the calling communication device can easily confirm mistaken passwords and re-input the password or check the password and re-input a correct one to communicate with the called communication device in a confidential manner. When a key operation in response to a voice message suggesting a normal facsimile communication is carried out by the operator of the calling communication device, a push tone signal corresponding to that key operation is entered to the called communication device. Upon detection of that push tone signal, the called communication device is switched to the normal facsimile communication not utilizing the mail boxes from the confidential communication utilizing the mail boxes. Consequently, this communication device of the invention is also convenient as when the caller does not know the password or when confidential communication is not particularly needed since exchange to normal facsimile communication can be performed.

It should be noted that the present invention can be realised even with the following changes and modifications:

(1) Another mailbox may be arranged in the image memory 18 to which no password is specified.

(2) A plurality of telephone sets T may be connected to the communication device of the invention.

(3) The data in the image memory 18 may be displayed in the display part 23 and may be printed out by the recording part 20 when necessary.

(4) Data with which the password has been judged to be non-agreeing may be stored in a no password-assigned mailbox of the image memory 18.

(5) Any suitable signal other than a push tone signal may be used to obtain a telephone or facsimile number dialed by an operator of the calling facsimile device.

What is claimed is:

1. A communication device for receiving data or voice from a caller via a telephone line, a single telephone number being assigned to the communication device and a plurality of facsimile numbers being assigned to the communication device, comprising:

a facsimile module;

a telephone set;

relay means for selectively connecting the telephone line to the facsimile module or telephone set;

means for detecting a telephone or facsimile number dialed by the caller;

a plurality of memory means for storing data respectively, each of the memory means corresponding to each of the facsimile numbers assigned to the communication device;

means for selecting one of the memory means based on the detected facsimile number;

means for causing the relay means to connect the telephone line to the telephone set if a telephone number is detected;

means for causing the relay means to connect the telephone line to the facsimile module if a facsimile number is detected: and means for causing the facsimile module to transmit the data to the caller from the selected memory means.

2. The communication device as in claim 1, further including means for detecting a password sent from the caller, and wherein a password is assigned to each of the memory means, and the data transmission to the caller is only allowed when the password from the caller and the password assigned to the selected memory means coincide with each other.

* * * * *